United States Patent
He et al.

(10) Patent No.: US 12,489,200 B2
(45) Date of Patent: Dec. 2, 2025

(54) ANTENNA APPARATUS FOR SMART WEARABLE DEVICE AND SMART WEARABLE DEVICE

(71) Applicant: GOERTEK INC., Weifang (CN)

(72) Inventors: Qijuan He, Weifang (CN); Siren Hu, Weifang (CN)

(73) Assignee: GOERTEK INC., Weifang (CN)

(*) Notice: Subject to any disclaimer, the term of this patent is extended or adjusted under 35 U.S.C. 154(b) by 104 days.

(21) Appl. No.: 18/403,981

(22) Filed: Jan. 4, 2024

(65) Prior Publication Data

US 2024/0136705 A1 Apr. 25, 2024
US 2024/0235013 A9 Jul. 11, 2024

Related U.S. Application Data

(63) Continuation of application No. PCT/CN2021/138608, filed on Dec. 16, 2021.

(30) Foreign Application Priority Data

Sep. 30, 2021 (CN) .......................... 202111168381.0

(51) Int. Cl.
 *H01Q 1/27* (2006.01)
 *A61B 5/00* (2006.01)
 (Continued)

(52) U.S. Cl.
 CPC ............ *H01Q 1/273* (2013.01); *A61B 5/1116* (2013.01); *A61B 5/681* (2013.01); *H01Q 1/2266* (2013.01)

(58) Field of Classification Search
 CPC .... A61B 5/1116; A61B 5/681; H01Q 1/2266; H01Q 1/273; H01Q 1/44; H01Q 9/0464
 See application file for complete search history.

(56) References Cited

U.S. PATENT DOCUMENTS 10,519,697 B1 * 12/2019 Zamansky ............ G09F 3/0376
2015/0359428 A1 12/2015 Lowe, Jr. et al.
(Continued)

FOREIGN PATENT DOCUMENTS

CN 102570005 A 7/2012
CN 106648105 A 5/2017
(Continued)

OTHER PUBLICATIONS

First Office Action issued in Chinese Patent Application No. 202111168381.0; mailed Aug. 5, 2022; 10 pgs.
(Continued)

*Primary Examiner* — Thien M Le
(74) *Attorney, Agent, or Firm* — HAUPTMAN HAM, LLP

(57) ABSTRACT

Disclosed are an antenna apparatus for a smart wearable device and a smart wearable device. The antenna apparatus for the smart wearable device includes an antenna base, a watchband electrically connected to the antenna base, an antenna body coupled to the antenna base, and a wearing posture detection circuit electrically connected to the antenna body. When the smart wearable device is worn on a user, a length formed from a tangent point between the watchband and a user's arm to a connection point between the watchband and the antenna base is a first length, and the wearing posture detection circuit is configured to determine worn posture of the smart wearable device according to the first length.

10 Claims, 5 Drawing Sheets

(51) Int. Cl.
*A61B 5/11* (2006.01)
*H01Q 1/22* (2006.01)

(56) References Cited

U.S. PATENT DOCUMENTS

| | | | |
|---|---|---|---|
| 2016/0099497 A1 | 4/2016 | Lee | |
| 2016/0174842 A1 | 6/2016 | Hyde et al. | |
| 2020/0073527 A1* | 3/2020 | Bandishti | G06F 3/0487 |
| 2020/0100693 A1* | 4/2020 | Velo | G16H 50/20 |
| 2020/0278749 A1* | 9/2020 | Baek | G06F 3/04847 |
| 2020/0341284 A1* | 10/2020 | Ichikawa | G02B 27/0093 |
| 2021/0000353 A1* | 1/2021 | Fujii | A61B 5/02125 |
| 2021/0169417 A1* | 6/2021 | Burton | A61B 5/4857 |
| 2022/0398937 A1* | 12/2022 | Furuya | G06F 3/016 |
| 2023/0418356 A1* | 12/2023 | Kasilya Sudarsan | G06F 1/163 |
| 2025/0119676 A1* | 4/2025 | Hu | H02J 7/0044 |

FOREIGN PATENT DOCUMENTS

| | | |
|---|---|---|
| CN | 106785345 A | 5/2017 |
| CN | 108288752 A | 7/2018 |
| CN | 108804170 A | 11/2018 |
| CN | 110048224 A | 7/2019 |
| CN | 110247173 A | 9/2019 |
| CN | 110336119 A | 10/2019 |
| CN | 111026273 A | 4/2020 |
| CN | 111916898 A | 11/2020 |
| CN | 112468913 A | 3/2021 |
| CN | 113346231 A | 9/2021 |
| JP | 2015204708 A | 11/2015 |

OTHER PUBLICATIONS

Notification of Grant issued in Chinese Patent Application No. 202111168381.0; mailed Oct. 10, 2022; 5 pgs.
International Search Report and Written Opinion issued in International Patent Application No. PCT/CN2021/138608; mailed Jun. 29, 2022; 11 pgs.

* cited by examiner

ANTENNA APPARATUS FOR SMART WEARABLE DEVICE AND SMART WEARABLE DEVICE

CROSS-REFERENCE TO RELATED APPLICATIONS

This application is a continuation application of International Application No. PCT/CN2021/138608, filed on Dec. 16, 2021, which claims priority to Chinese Patent Application No. 202111168381.0, filed on Sep. 30, 2021. The disclosures of the above-mentioned applications are incorporated herein by reference in their entireties.

TECHNICAL FIELD

The present application relates to the technical field of antenna, and in particular to an antenna apparatus for a smart wearable device and a smart wearable device.

BACKGROUND

With the popularization of artificial intelligence and wearable devices, there are more and more detection methods for wearable devices. Common wearable detection methods mostly use optical sensors or sensing capacitors. Optical sensors have high requirements for optical path sealing and product assembly process control, and may be equipped with optical path filter components at the same time. Capacitive sensors need to be designed according to the ID form, and the sensing capacitor usually needs to be designed separately, which is easily subject to the volume limitations of smart wearable devices.

SUMMARY

The main purpose of the present application is to propose an antenna apparatus for a smart wearable device and a smart wearable device, aiming to utilize the antenna structure of the smart wearable device to achieve wearing detection.

In order to achieve the above objectives, the present application proposes an antenna device for a smart wearable device, the antenna device for the smart wearable device includes:
an antenna base;
a watchband electrically connected to the antenna base, when the smart wearable device is worn by a user, a length formed from a tangent point between the watchband and a user's arm to a connection point between the watchband and the antenna base is a first length;
an antenna body coupled to the antenna base; and
a wearing posture detection circuit electrically connected to the antenna body and configured to determine a worn posture of the smart wearable device according to the first length.

In an embodiment, the antenna body and the antenna base constitute a detection capacitance, and the wearing posture detection circuit is configured to determine the worn posture of the smart wearable device according to a size of the detection capacitance.

In an embodiment, the watchband forms two tangent points with the user's arm, lengths respectively formed by the two tangent points and a connection point of the antenna base are a first sub-length and a second sub-length;
the antenna body and the antenna base constitute a first detection capacitance and a second detection capacitance; and
the wearing posture detection circuit is configured to determine the worn posture of the smart wearable device according to a size of the first detection capacitance and a size of the second detection capacitance.

In an embodiment, the antenna apparatus for the smart wearable device further includes a mechanical electronic unit corresponding to a position of the watchband, the mechanical electronic unit is respectively connected to the antenna body and the antenna base, and the mechanical electronic unit is electrically connected to the antenna base.

In an embodiment, two mechanical electronic units are provided, and
the two mechanical electronic units are respectively located on both sides of a center line of the antenna base along a direction of the watchband; or
the two mechanical electronic units are respectively located on a same side of a center line of the antenna base along a direction of the watchband.

In an embodiment, the antenna apparatus for the smart wearable device further includes:
an adjustable capacitor, one end of the adjustable capacitor is connected to the antenna base; and
an antenna adjustment controller, the antenna adjustment controller is electrically connected to the wearing posture detection circuit and the adjustable capacitor respectively, and is configured to adjust a capacitance value of the adjustable capacitor according to the worn posture to configure antenna parameters of the antenna apparatus for the smart wearable device.

In an embodiment, the antenna adjustment controller includes:
a processor electrically connected to the wearing posture detection circuit, and the processor is configured to output a corresponding control signal according to the worn posture; and
an adjustable capacitor drive chip, a controlled end of the adjustable capacitor drive chip is connected to the processor, an output end of the adjustable capacitor drive chip is electrically connected to the adjustable capacitor, and the adjustable capacitor drive chip is configured to adjust the capacitance value of the adjustable capacitor according to the control signal to configure the antenna parameters of the antenna apparatus for the smart wearable device.

In an embodiment, the antenna body further includes an annular metal frame coupled to the antenna base.

In an embodiment, the antenna apparatus for the smart wearable device further includes a motion sensor connected to the wearing posture detection circuit. The motion sensor is configured to obtain motion data of the smart wearable device, and the wearing posture detection circuit is further configured to determine the worn posture of the smart wearable device based on the motion data of the smart wearable device.

The present application also proposes a smart wearable device, the smart wearable device including the antenna apparatus for the smart wearable device as described above.

In the present application, by providing an antenna base, a watchband and an antenna body, the watchband and the antenna body are electrically connected to the antenna base respectively, and according to the first length which is a length formed from a tangent point between the watchband and a user's arm to a connection point between the watchband and the antenna base when a smart wearable device is worn by a user through the antenna body, the worn posture of the smart wearable device is determined. In the present application, the antenna base and the watchband are in combination with the antenna body to realize the wearing detection of the smart wearable device.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

DETAILED DESCRIPTION OF THE EMBODIMENTS

Figure 1:
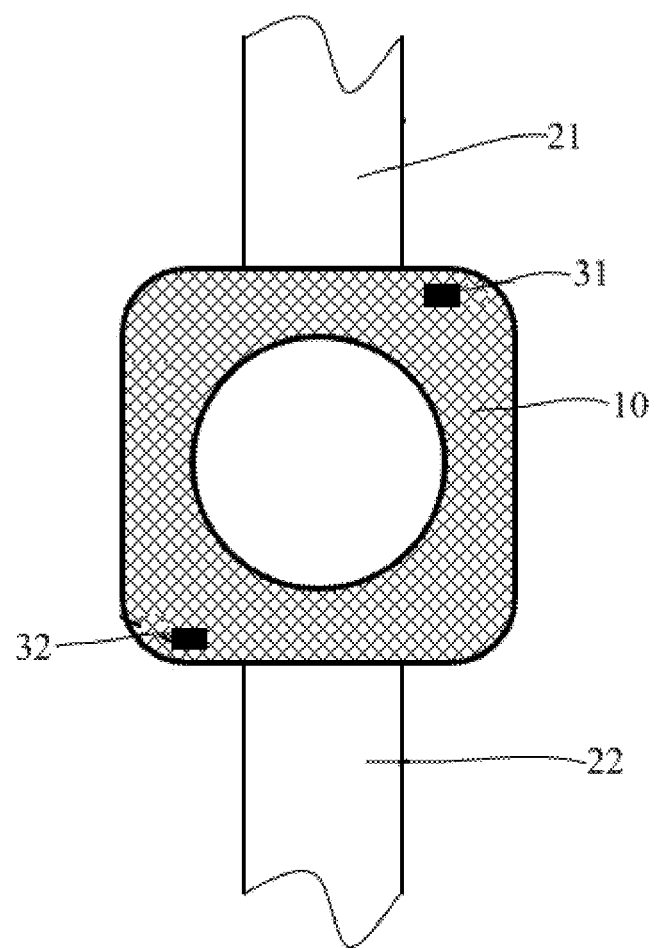
FIG. 1 is a structural schematic view of a smart wearable device according to an embodiment of the present application.
Figure 2:
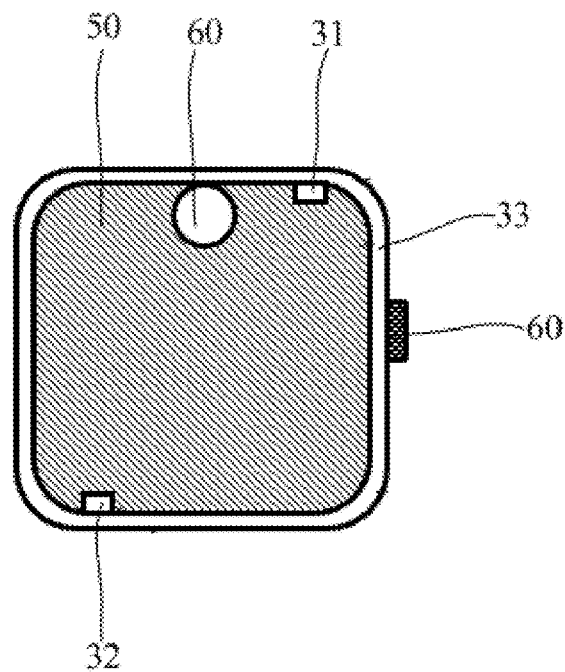
FIG. 2 is a structural schematic view of an antenna device for a smart wearable device being applied to a smart wearable device according to an embodiment of the present application.
Figure 3:
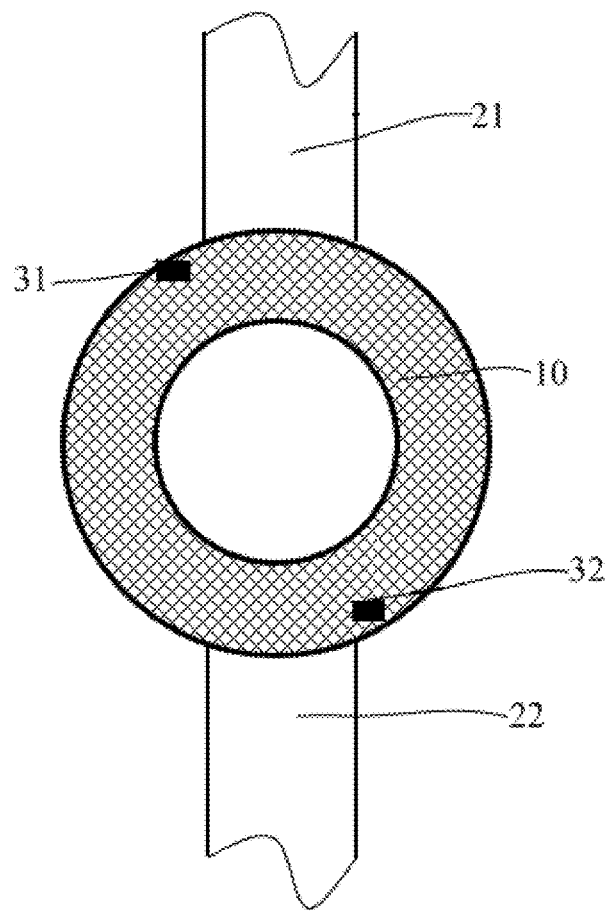
FIG. 3 is a structural schematic view of a smart wearable device according to an embodiment of the present application.
Figure 4:
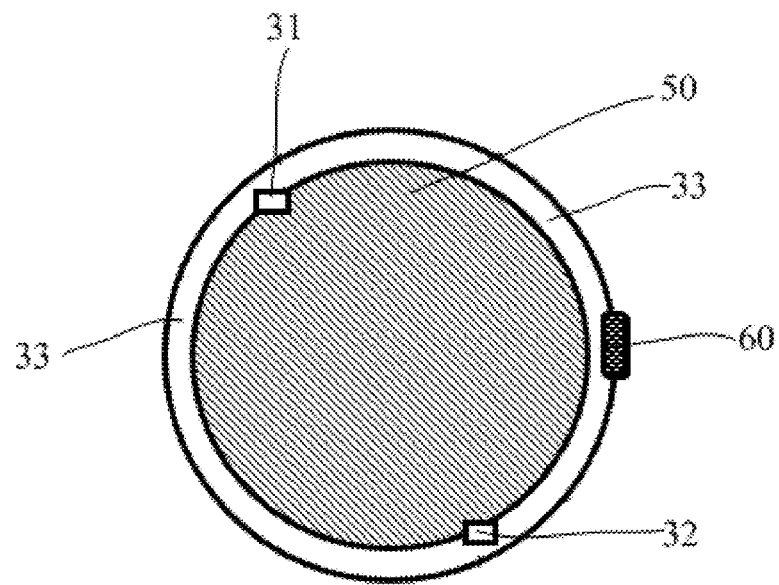
FIG. 4 is a structural schematic view of an antenna device for a smart wearable device being applied to a smart wearable device according to another embodiment of the present application.
Figure 5:
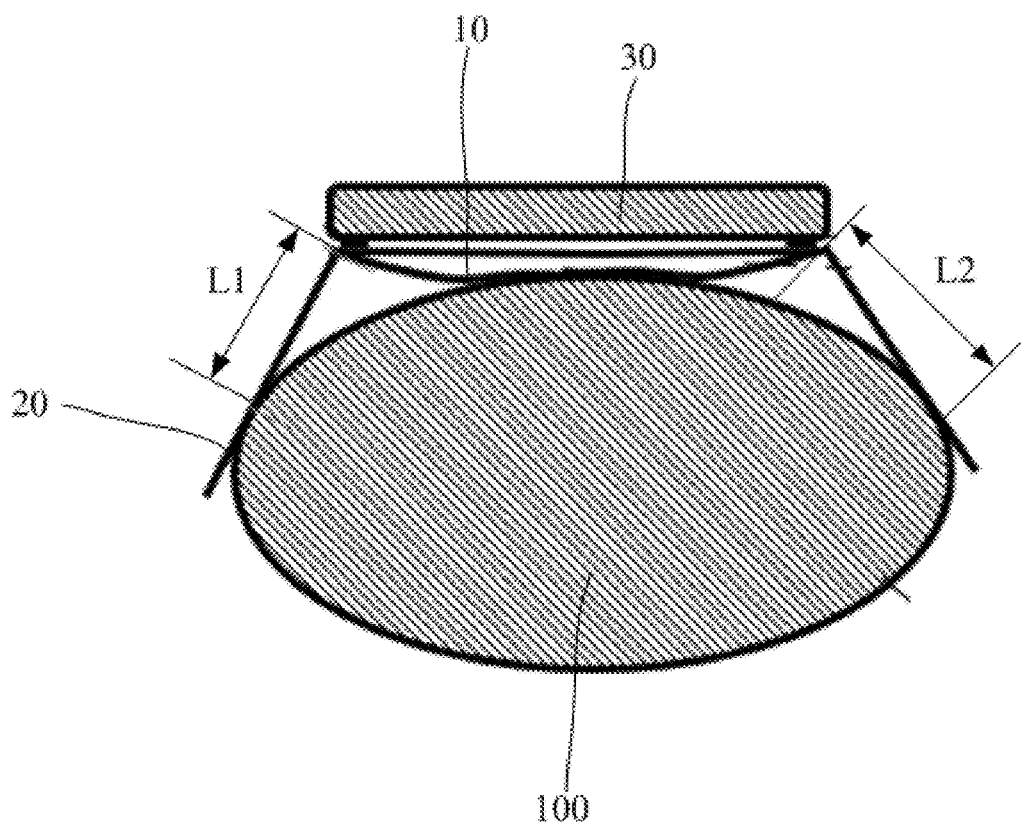
FIG. 5 is a structural schematic view of a smart wearable device being configured to a user's arm according to an embodiment of the present application.
Figure 6:
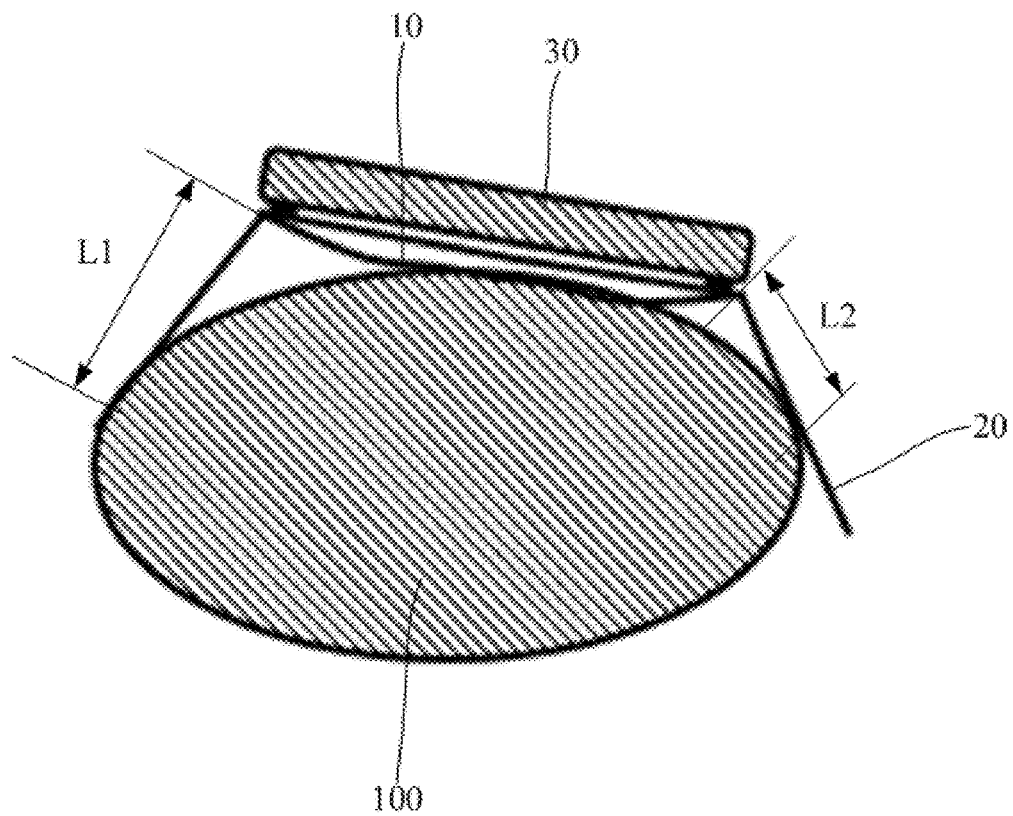
FIG. 6 is a structural schematic view of a smart wearable device being configured to a user's arm according to another embodiment of the present application.

The technical solutions in the embodiments according to the present application will be described below in conjunction with the accompanying drawings in the embodiments of the present application. Obviously, the described embodiments are only some of the embodiments of the present application, but not all of the embodiments. Based on the embodiments of the present application, all other embodiments obtained by those of ordinary skill in the art without any creative work fall within the scope of the present application.

It should be noted that, if there are directional instructions (such as up, down, left, right, front, back or the like) involved in the embodiments according to the present application, the directional indications are only used to explain the relative positional relationship, movement and so on between various components in a specific posture (as shown in the accompanying drawings). If the specific posture changes, the directional indication will also change accordingly.

In addition, in the embodiments according to the present application, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the technical solutions of various embodiments can be combined with each other, but it must be based on that those of ordinary skill in the art can realize. When the combination of technical solutions is contradictory or cannot be realized, it should be considered that such combination of technical solutions does not exist and is not within the protection scope claimed by the present application.

The term "and/or" herein is just an association relationship describing related objects, indicating that three relationships can exist, for example, A and/or B can mean: A alone exists, A and B exist simultaneously, and B exists alone. In addition, the character "/" in this article generally indicates that the related objects are an "or" relationship.

The present application proposes an antenna apparatus for a smart wearable device, which is applied in smart wearable devices, and the smart wearable device can be a smart watch, a smart bracelet and so on. With the popularization of artificial intelligence and wearable devices, there are more and more adaptive detection methods for wearable devices. Common wearable detection methods mostly use optical sensors or sensing capacitors. Optical sensors have high requirements for optical path sealing and product assembly process control, and may be equipped with optical path filter components at the same time. Capacitive sensors need to be designed according to the ID form, and the sensing capacitor usually needs to be designed separately. That is to say, more components need to be added to smart wearable devices. However, smart wearable devices, such as smart watches and bracelets, are gradually entering people's lives as miniaturized smart devices that integrate smart applications and communication interaction, and wireless communication modules, CPU, power supply and other modules are integrated inside the smart wearable devices. Due to the size limitation of smart wearable devices, it is difficult to add components to smart wearable devices.

In order to solve the above problems, referring to FIG. 1 to FIG. 8, an antenna apparatus for a smart wearable device includes an antenna base 10, a watchband 20, an antenna body 30 and a wearing posture detection circuit.

The watchband 20 is electrically connected to the antenna base 10, and when the smart wearable device is worn by a user, a length formed from a tangent point between the watchband 20 and a user's arm 100 to a connection point between the watchband 20 and the antenna base 10 is a first length.

The antenna body 30 is coupled to the antenna base 10.

The wearing posture detection circuit is electrically connected to the antenna body 30 and configured to determine worn posture of the smart wearable device according to the first length.

In this embodiment, the antenna base 10 can be configured as the grounding part in the antenna device, the antenna base 10 can be a metal base, for example, it can be a pure metal base, or a metal base made at least partially made of metal material. The antenna base 10 specifically may be disposed on one side of the bottom shell of the smart wearable device, or may be integrally formed with the bottom shell of the smart wearable device, that is, the antenna base 10 is a partial structure of the bottom shell. The bottom shell of the smart wearable device can be ceramic, PC or glass or the like, in this embodiment, the bottom shell of the smart wearable device can be configured as a medium between the antenna body 30 and the antenna base 10 of the smart wearable device, thus realizing the coupled electrical connection between the antenna body 30 and the antenna base 10. Specifically, the antenna base 10 can be set in the shape of a hollow metal ring, and the middle ring area can be set in a hollow structure; furthermore, the hollow structure can also be filled with a filling piece of transparent material, so that a heart rate sensor or the like can detect vital sign parameters of the human body through the transparent filling piece. When the smart wearable device is worn on the user's wrist, the bottom shell fits the user's wrist, the antenna base 10 can be in contact with the user's wrist, and the thickness, size and shape of the antenna base 10 can be set according to actual application products and application environments to meet different application needs. In a specific embodiment, the shape of the antenna base 10 may be circular or square, such as rectangle or square.

According to the user's wearing habits, the smart wearable device can be worn by the user's left hand or right hand. It is understandable that watchband 20 can be distinguished according to the material it uses, such as metal watchband 20, leather watchband 20, leather watchband 20, silicone watchband 20 and jewelry watchband 20 and so on, and it can also be distinguished according to the tightening method of its watchband 20, such as butterfly buckles, pin buckles, buckles and so on. In this embodiment, the watchband 20 may be a metal watchband 20, or may be a metal watchband 20 made at least partially of metal material, for example, when the watchband 20 is implemented as a non-metallic watchband 20 such as silicone or leather, flanking metals can be designed to be embedded in the watchband 20 to achieve electrical connection between the watchband 20 and the metal base. Watchband 20 and the antenna base 10 can be set up as one piece or separately, when being set up as one piece, the display assembly, antenna adjustment controller 40 and so on can be detachably connected to the watchband 20 and the antenna base 10, and users can replace different the antenna base 10 and watchband 20 according to actual application requirements.

The number of watchband 20 can be one or two, and when being set to one, the two ends of watchband 20 are fixed at both ends of the dial; when being set to two, one end of the two watchbands 20 is fixed on both ends of the dial respectively, and the other ends of the two watchbands 20 can be detachably connected through buckles, pin buckles, butterfly buckles or the like. In this embodiment, two watchbands 20 are provided as an example, the two watchbands 20 are the first watchband 21 and the second watchband 22 respectively, the first watchband 21 is provided at one end of the antenna base 10, the second watchband 22 is provided at the other end of the antenna base 10 away from the second watchband 22. When the smart wearable device is worn on the user's wrist, the two watchbands 20 form two tangent points with the user's arm 100, lengths respectively formed by the two tangent points and connection points of the antenna base 10 are a first sub-length and a second sub-length. Specifically, the tangent point formed by the first watchband 21 and the user's wrist is tangent point A, and the tangent point formed by the second watchband 22 and the user's wrist is tangent point B. The first length formed from the tangent point between the watchband 20 and the user's arm 100 to the connection point between the watchband 20 and the antenna base 10 respectively is: the first sub-length L1 formed by the tangent point A distances from the antenna base 10, and the second sub-length L2 formed by the tangent point B distances from the antenna base 10. The distance between the two tangent points and the connection points of the antenna base 10 is different, that is, the first sub-length L1 and the first sub-length L2 are different, and certainly in other embodiments, they can also be set to be the same. Moreover, the first sub-length L1 and the second sub-length L2 will change depending on whether the left hand or the right hand is worn, for example, when switching from the left hand to the right hand, the first sub-length L1 increases, while the second sub-length L2 decreases, and when switching from the right hand to the left hand, the first sub-length L1 decreases, while the second sub-length L2 increases.

The wearing posture detection circuit can be implemented using a microprocessor, such as microcontroller, digital signal processor (DSP) and so on. The wearing posture detection circuit can also be implemented using a microprogrammed control unit (MCU) of a smart wearable device, the wearing posture detection circuit is electrically connected to the antenna body 30, the antenna body 30 and the antenna base 10 are coupled. As the first length changes, the electrical parameters (such as current, voltage and so on) generated by the coupling of the antenna body 30 and the antenna base 10 will also change accordingly. The wearing posture detection circuit can determine the specific value of the first length based on the changes in the electrical parameters.

Based on this, this embodiment can form a differential relationship and cooperation between the first sub-length and the second sub-length in the smart wearable device to establish a mapping relationship between left hand and right hand recognition. According to the change of the first sub-length and the second sub-length, when the user wears the smart wearable device, it can be specifically identified whether the smart wearable device is currently worn by the user's left hand or right hand.

In some embodiments, according to actual application requirements, the dial can be adapted to be worn by the user's left hand or right hand, and the display interface of the display assembly of the dial can also be adapted to switch between the left hand and right hand. And in the smart wearable device provided with the knob 70, the position of the knob is usually set according to the left hand wearing, when the user wears the smart wearable device to the left hand, the position of the knob 70 is toward the user's right hand. This embodiment can also combine antenna detection with data from the internal gyroscope according to actual application requirements to determine whether the watch is currently worn on the left hand or the right hand, and can combine gestures and postures to record statistical work, exercise, sleep and other scenes to provide support for health analysis.

It is understandable that, if the length of the tangent point formed between the watchband 20 of the smart wearable device and the arm from the antenna base 10 is different, the current on the antenna base 10 will be different, correspondingly, the currents flowing to the electrical connector CN1 in the antenna body 30 and then to the adjustable capacitor C1 are different, and the current gesture of the user can be determined. For non-left-handed people, the activity of the left hand is less than that of the right hand, therefore, when worn on the left hand, the watchband 20 on the left hand tends to be longer on the outside of the wrist and the watchband 20 on the inside is shorter. Considering that some users are left-handed writing habits, when the user wears it on the left hand and the left hand moves a lot, such as when writing, watchband 20 will change and it may cause misjudgment, the above example of changing by the length of watchband 20 can only be applied to the judgment of gesture posture. In order to accurately determine the left wearing or right wearing, in some embodiments, a motion sensor, such as a gyroscope, can also be provided in the smart wearable device to acquire the user's motion, combining the motion data obtained by the gyroscope to further determine whether the smart watch is worn on the left hand or the right hand, the movement trajectory of the user's arm can be determined based on the spatial position data detected by the motion sensor; and based on the movement trajectory of the user's arm, it is determined whether the smart watch is worn on the left hand or the right hand. Specifically, when the user wears it on his left hand, there will be corresponding movement data when the user performs movements such as raising his wrist after wearing it; when the user wears it on his right hand, there will be another corresponding movement data when the user performs movements such as raising his wrist after wearing it; the two motion data will be different due to different motion trajectories, therefore, it can be determined whether the user is currently wearing the left hand or the right hand based on the difference in the first length formed from the tangent point between the watchband 20 and the user's arm 100 to the connection point between the watchband 20 and the antenna base 10 and the difference in motion data obtained by the motion sensor. In some embodiments, the motion sensor serves as a sports watch, it can also acquire the user's motion data, and can generate gesture control instructions based on the motion data generated by the user to achieve the purpose of controlling the smart wearable device.

In the present application, the worn posture of the smart wearable device is determined through providing the antenna base 10, the watchband 20 and the antenna body 30 respectively electrically connected to the antenna base 10, and through the antenna body 30 based on the first length formed from the tangent point between the watchband 20 and the user's arm 100 to the connection point between the watchband 20 and the antenna base 10 when the smart wearable device is worn by the user. The present application uses the antenna base 10 and watchband 20 combined with the antenna body 30 to realize wearing detection of smart wearable devices.

Referring to FIG. 1 to FIG. 8, in an embodiment, the antenna body 30, watchband 20 and the antenna base 10 constitute a detection capacitance; and the wearing posture detection circuit is configured to determine the worn posture of the smart wearable device according to a size of the detection capacitance.

In this embodiment, the antenna body 30 is coupled to the antenna base 10, detection capacitances are formed between the antenna body 30 and the antenna base 10 and between the antenna body 30 and the watchband 20 electrically connected to the antenna base 10, the antenna body 30 is equivalent to one polar plate of the detection capacitance, and the antenna base 10 and watchband 20 are equivalent to the other polar plate of the detection capacitance. The coupling between the watchband 20 and the arm is an open space coupling, according that the charge is concentrated at the edges of the metal, that is, the tangent position between the metal embedded in the watchband 20 and the arm can cause a sudden change in the charge distribution. Specifically, when the user's wrist respectively comes into contact with the antenna base 10 and watchband 20, the effective length between the antenna base 10 and watchband 20 will change, that is to say, the area of the polar plate composed of the antenna base 10 and watchband 20 in the detecting capacitor is changed. According to electrostatics, for parallel plate capacitors, there is the following relational expression:

$$C = \varepsilon r \cdot S/L \quad (1)$$

Among them, εr is the dielectric constant; S is the area of the two polar plates in the detection capacitance formed by the antenna body 30, the antenna base 10 and watchband 20; L is the distance between the two polar plates in the detection capacitance, that is, the distance between the antenna body 30 and the antenna base 10. It can be seen from formula (1) that the capacity of the capacitor is proportional to the dielectric constant of the medium, proportional to the area of the two polar plates, and inversely proportional to the distance between the two polar plates.

In addition, when a capacitor is charged with Q amount of charge, then the two polar plates of the capacitor must form a certain voltage, as shown in the following relational expression:

$$C = Q/V \quad (2)$$

Among them, Q is the amount of charge carried by the detection capacitance, that is, the charging charge. The charging charge is fixed in a capacitor, when the effective length between the antenna base 10 and watchband 20 is changed, that is, the effective area of the two polar plates of the capacitor is changed, resulting in a change in ΔS, it can be seen from formula (1) that a change in ΔC will inevitably occur. From formula (2), it is further known that due to the change in ΔC, a change in ΔV will occur. According to the voltage and the current relationship of the capacitive element, assume that the voltage and the current are functions of time, and find the relationship between the voltage and the current. When the voltage between the polar plates changes, the charge on the polar plates also changes, thus generating a current in the capacitive element, and this current can be obtained by the following relational expression:

$$I = dq/dt = C(dV/dt) \quad (3)$$

In summary, it can be seen that the current flowing through the detection capacitance is directly proportional to the electric capacity, and the electric capacity is directly proportional to the area of the two polar plates. Based on this, as the length between the tangent point of the watchband 20 and the antenna base 10 becomes shorter, the electric capacity of the detection capacitance becomes smaller, and the current flowing from the antenna base 10 to the antenna body 30 also becomes smaller. On the contrary, the length between the tangent point of the watchband 20 and the antenna base 10 becomes longer, the electric capacity of the detection capacitance becomes larger, and the current flowing from the antenna base 10 to the antenna body 30 also becomes larger. By detecting whether the change of the electric capacity generated by the detection capacitance becomes larger or smaller, the left hand or the right hand can be identified, and then when the user wears the smart wearable device, it can be specifically identified whether the smart wearable device is currently worn by the user's left hand or right hand.

In this embodiment, the antenna body 30 and the antenna base 10 constitute two detection capacitances, which are a first detection capacitance and a second detection capacitance respectively.

The wearing posture detection circuit is configured to determine the worn posture of the smart wearable device according to a size of the first detection capacitance and a size of the second detection capacitance.

In this embodiment, specifically, it can be set corresponding to the two ends of the watchband 20, or corresponding to the position of the connection between the two watchbands 20 and the dial. Taking two watchbands 20 as an example, the antenna body 30 forms a first detection capacitance with the first watchband 21 and the antenna base 10 via the antenna base 10, the first detection capacitance can detect the change in the first sub-length of the tangent point formed by the first watchband 21 and the wrist distance the antenna base 10. The antenna body 30 forms a first detection capacitance with the second watchband 22 and the antenna base 10 via the antenna base 10, and the second detection capacitance can detect the change in the second sub-length of the tangent point formed by the second watchband 22 and the wrist distance the antenna base 10.

Based on the characteristics that the current flowing through the detection capacitance is directly proportional to the electric capacity, and the electric capacity is directly proportional to the area of the two polar plates, if the length between the tangent point of the first watchband 21 and the antenna base 10 becomes shorter, the electric capacity of the first detection capacitance becomes smaller, and the current flowing from the antenna base 10 to the first mechanical electronic unit also becomes smaller. At this time, the length between the tangent point of the second watchband 22 and the antenna base 10 becomes longer, the electric capacity of the second detection capacitance becomes larger, and the current flowing from the antenna base 10 to the second mechanical electronic unit also becomes larger. By detecting the differential change generated by the electric capacity generated by the first detection capacitance and the second detection capacitance, the left hand or the right hand can be identified, and then when the user wears the smart wearable device, it can be specifically identified whether the smart wearable device is currently worn by the user's left hand or right hand. In the same way, when the length between the tangent point of the second watchband 22 and the antenna base 10 becomes shorter, the length between the tangent point of the first watchband 21 and the antenna base 10 becomes longer and the opposite change occurs, the smart wearable device can also be detected and recognized when switching between the user's left hand and the right hand. In this embodiment, by setting up two mechanical electronic units 31, 32 to form differential detection capacitances, the left hand and the right hand identification self-test of the smart wearable device can be formed, thus avoiding misjudgment of the smart wearable device when the user accidentally triggers it, which is helpful to improve the recognition accuracy of left hand and right hand.

Figure 7:
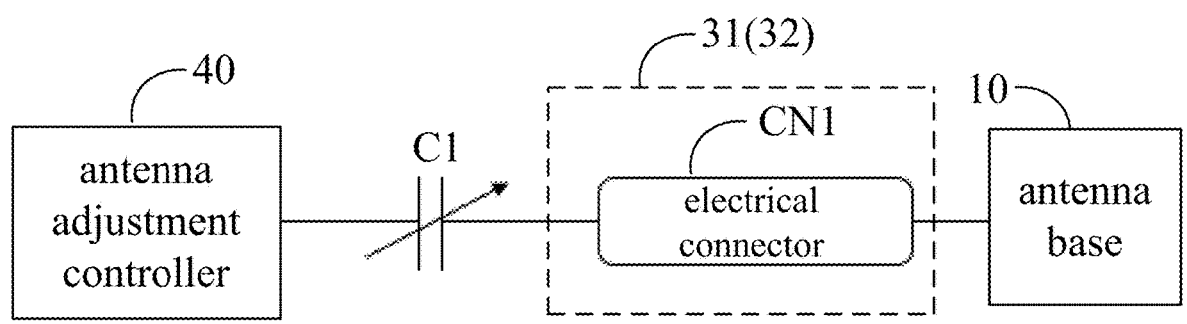
FIG. 7 is a circuit structural schematic view of an antenna device for a smart wearable device according to an embodiment of the present application.

Referring to FIG. 7, in an embodiment, the antenna body 30 further includes: an antenna adjustment controller 40 electrically connected to the wearing posture detection circuit.

The antenna adjustment controller 40 is configured to determine the smart wearable device as the worn posture according to the first length, and configure the antenna parameters of the two antenna apparatuses for the smart wearable device according to the worn posture.

It should be noted that when designing the antenna of the smart wearable device, it is usually only based on the user's wearing habits, for example, the traditional habit of wearing a watch is the left hand, and the antenna design of the smart wearable device is also debugged and set for the left hand. When the smart wearable device is worn on the right hand, the antenna performance is not equivalent, at this time, the antenna performance may not work in an optimal state and affect the normal use of the smart wearable device. Therefore, in this embodiment, for the case where the antenna performance of the smart wearable device is asymmetric when worn by the left hand and the right hand, the antenna parameters of the adjustable capacitor are set to be adjustable, so that adaptively adjusting the antenna parameters of the antenna body 30 according to the difference between the left hand and the right hand, thereby allowing the antenna performance can be adaptively adjusted according to whether it is worn on the left hand or the right hand, and it is no need to impose design restrictions on the antenna radiation monomer, which improving the convenience of use of the smart wearable device. The present application uses the antenna base 10 and watchband 20 to detect the length of the tangent point between the watchband 20 and the user's wrist from the antenna base 10, while simultaneously achieving improvement of antenna radiation efficiency and wearing detection, without the need to set up separate sensors and circuits for left hand and right hand recognition, and the antenna apparatus for the smart wearable device can be reused, which is beneficial to reducing the device usage of smart wearable devices, and the size of the electronic control board 50 of the smart wearable device can be reduced, making the smart wearable device lighter.

Referring to FIG. 1 to FIG. 4, in an embodiment, the antenna apparatus for the smart wearable device further includes a mechanical electronic unit 31 (32) corresponding to a position of the watchband, the mechanical electronic unit 31 (32) is respectively connected to the antenna body 30 and the antenna base 10, and the mechanical electronic unit 31 (32) is electrically connected to the antenna base 10.

In this embodiment, the mechanical electronic unit 31 (32) includes an electrical connector CN1, and the electrical connector CN1 is an elastic electrical connector CN1. The mechanical electronic unit 31 (32) can realize the detachable electrical connection between the antenna body 30 and the antenna base 10. The number of mechanical electronic units is two; and the two mechanical electronic units 31, 32 are respectively located on both sides of a center line of the antenna base 10 along a direction of the watchband 20; or the two mechanical electronic units 31, 32 are respectively located on a same side of a center line of the antenna base 10 along a direction of the watchband 20.

In this embodiment, the two mechanical electronic units 31, 32 can form two antenna monomers with the antenna base 10, and the two antenna monomers can work in two same frequency bands or two different frequency bands, for example, two mechanical electronic units 31, 32 both work in the LTE700 frequency band, at this time, the two mechanical electronic units 31, 32 can make the smart wearable device have good low-frequency characteristics. The two mechanical electronic units 31, 32 can also respectively work in the LTE700 frequency band and the LTE1700 frequency band.

The two mechanical electronic units 31, 32 can be set to correspond to the position of the watchband 20, and they can be set as close to the position of the watchband 20 as possible to shorten the distance from the watchband 20. When the two mechanical electronic units 31, 32 are respectively located on both sides of a center line of the antenna base 10 along a direction of the watchband 20, one of the mechanical electronic units 31 can be set at the 1 o'clock position of the dial, and the other mechanical electronic unit 32 can be set at the 7 o'clock position of the dial. Alternatively, one of the mechanical electronic units 31 can be set at the 11 o'clock position of the dial, and the other mechanical electronic unit 32 can be set at the 5 o'clock position of the dial.

When the two mechanical electronic units 31, 32 are respectively located on a same side of a center line of the antenna base 10 along a direction of the watchband 20, one of the mechanical electronic units 31 can be set at the 1 o'clock position of the dial, and the other mechanical electronic unit 32 can be set at the 5 o'clock position of the dial. Alternatively, one of the mechanical electronic units 31 can be set at the 11 o'clock position of the dial, and the other mechanical electronic unit 32 can be set at the 7 o'clock position of the dial.

In this embodiment, a camera 60 can be provided on the dial of the smart wearable device, for example, on the surface cover of the dial, the camera 60 can be set in the 12 o'clock direction of the dial, the two mechanical electronic units 31, 32 can be set on one side of the camera 60, that is, at the 1 o'clock position or the 11 o'clock position, another mechanical electronic unit 32 is disposed at a relatively far end of the camera 60, such as the 5 o'clock position or the 7 o'clock position.

Referring to FIG. 7, in an embodiment, the antenna apparatus for the smart wearable device further includes an adjustable capacitor C1, one end of the adjustable capacitor C1 is connected to the antenna adjustment controller 40, and another end of the adjustable capacitor C1 is connected to the antenna base 10.

The antenna adjustment controller 40 is configured to adjust a capacitance value of the adjustable capacitor C1 according to the worn posture to configure antenna parameters of the antenna apparatus for the smart wearable device.

The adjustable capacitor C1 can be specifically arranged on the electronic control board 50 of the smart wearable device, and is connected in series between an antenna network of the smart wearable device and the antenna base 10. When realizing the adjustable antenna performance of the smart wearable device in this embodiment, one end of the adjustable capacitor C1 can be connected to the antenna adjustment controller 40 in the antenna network of the smart wearable device, and another end of the adjustable capacitor C1 can be electrically connected through the electrical connector CN1, such as the contact PAD (pad) of the elastic structure, the spring piece contacts the reserved PAD point and other electrical connections, thereby achieving electrical connection with the antenna base 10. In some embodiment, the value of the adjustable capacitor C1 is in the range of 0.5 pF~10 pF. The elastic electrical connector CN1 can be configured as a spring piece, a pogo pin and so on, and the pluggable electrical connection between the antenna base 10 and the adjustable capacitor C1 can be achieved through the electrical connector CN1.

In this way, when the antenna apparatus is working, a coupling current flows from the antenna base 10 to the adjustable capacitor C1 on the electrical connector CN1, that is, the current flows from the antenna base 10 to the adjustable capacitor C1 through the electrical connector CN1, then it flows to the antenna network of the smart wearable device through the adjustable capacitor C1, so that the antenna base 10 and the mechanical electronic unit form an antenna monomer to realize the radiation and reception of wireless signals. In this embodiment, the antenna base 10 and the watchband 20 are designed in one piece, the antenna body 30 and the antenna base 10 can be detachably connected from the electrical connector CN1, which can meet the needs of the different watchband 20 or storage needs.

The capacitance value of the adjustable capacitor C1 can be adjusted, and the adjustable capacitor C1 can improve the performance of the antenna in the high frequency band. According to the working principle of the adjustable antenna: by fine-tuning the capacitance value of the adjustable capacitor C1, the impedance matching of the antenna will produce a variety of different states due to the capacitance value of the adjustable capacitor C1, these different impedance matching states are combined together, in different scenarios, such as when the left hand and right hand are worn differently, the corresponding matching states can be given, so that the antenna return loss and efficiency in this state are optimal, which enables the antenna to work at optimal performance under any circumstances.

One end of the adjustable capacitor C1 can also be connected to the radiator of the antenna body 30, and the other end of the adjustable capacitor C1 is connected to the antenna base 10 through the electrical connector CN1, thereby realizing the coupling connection between the radiator and the antenna base 10. In this embodiment, the length detection of the first length can also be achieved through the adjustable capacitor C1, and the first length is the length formed from the tangent point between the watchband and the user's arm to the connection point between the watchband and the antenna base, thereby realizing the worn posture of the smart wearable device.

Figure 8:
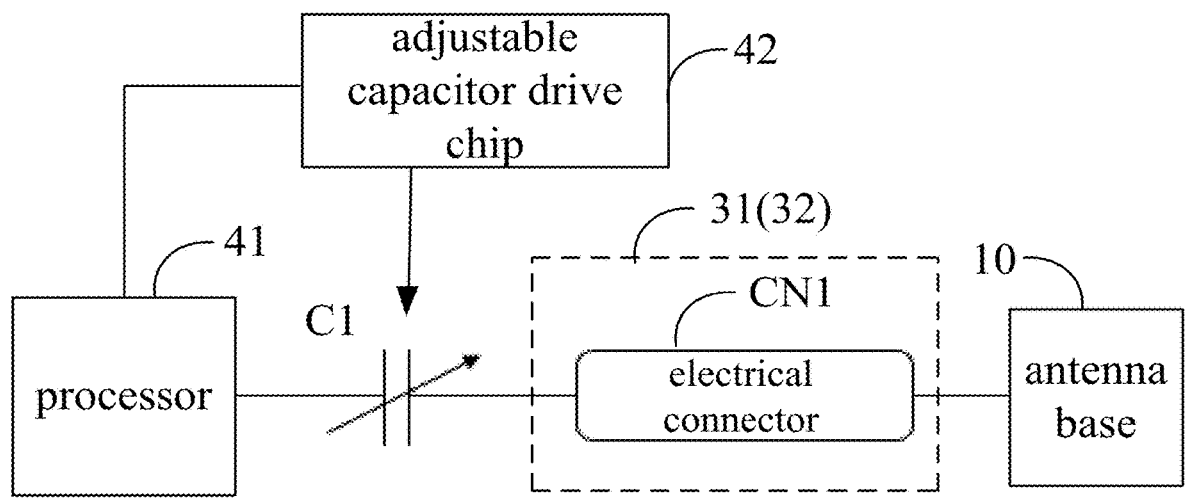
FIG. 8 is a circuit structural schematic view of an antenna device for a smart wearable device according to another embodiment of the present application.

Referring to FIG. 8, in an embodiment, the antenna adjustment controller 40 includes a processor electrically 41 and an adjustable capacitor drive chip.

The processor electrically 41 is connected to the wearing posture detection circuit, and the processor 41 is configured to output a corresponding control signal according to the worn posture.

A controlled end of the adjustable capacitor drive chip 42 is connected to the processor 41, an output end of the adjustable capacitor drive chip 42 is electrically connected to the adjustable capacitor C1, and the adjustable capacitor drive chip 42 is configured to adjust the capacitance value of the adjustable capacitor C1 according to the control signal to configure the antenna parameters of the antenna apparatus for the smart wearable device.

In this embodiment, the processor 41 can process the received data and signals by running or executing stored software programs and/or modules and calling stored data, thereby determining whether the user is wearing the left hand or the right hand at this time according to the received current signal, and calculating the adjustment amount of the capacitance value of the adjustable capacitor C1 based on the mapping relationship between the antenna, left/right hand and antenna performance. For example, the capacitance range of the adjustable capacitor C1 is a maximum of 8.2 pF, a minimum of 1.2 pF, and a step of 0.2 pF, gradually adjusting the capacitance value of the adjustable capacitor C1 after calculating the adjustment amount of the capacitance value. The processor 41 specifically can control the operation of the adjustable capacitor drive chip 42, and adjust the capacitance of the adjustable capacitor C1 by controlling the bias voltage of the adjustable capacitor drive chip 42, the impedance matching of the antenna will work in its corresponding matching state due to the change in the capacitance of the adjustable capacitor C1, making the antenna return loss and efficiency optimal in this state. In this embodiment, the capacitance configuration table can also be set, setting in advance according to actual needs, determining whether the user is wearing the left hand or the right hand at this time based on the size of the received current signal, according to the mapping relationship among the antenna, the left/right hand and the antenna performance, according to the size of the detected current signal, selecting the appropriate capacitance value from the capacitance configuration table, and adjusting the adjustable capacitor C1.

In this embodiment, after the user wears the product, based on the detection status between the two flank metals and the arm, and performing signal processing such as calculation and comparison on the detected current signals obtained, so as to determine the left/right hand wearing posture according to the detected current signal size, and controlling the operation of the adjustable capacitor drive chip 42, thereby adaptively adjusting the capacitance value of the adjustable capacitor C1 according to the corresponding relationship between the current signal and configuration table of the capacitance value. For example, in the initial state, the corresponding capacitance values of the two mechanical electronic units 31, 32 are both 10 pF, when the user wears the smart wearable device, the processor 41 calculates the size of the current signal and determines that the current wearing state of the smart wearable device is detected as being worn on the left hand. When the antenna device works in the LTE700 frequency band, according to the capacitance configuration table, adjusting the adjustable capacitor C1 configuration corresponding to one mechanical electronic unit 31 to 8.2 pF and the adjustable capacitor C1 corresponding to another mechanical electronic unit 32 to 6.8 pF, the antenna works in the best state. When the antenna works in the LTE1700 frequency band, according to the capacitance configuration table, adjusting the adjustable capacitor C1 configuration corresponding to one mechanical electronic unit 31 to 1.2 pF, and the adjustable capacitor C1 configuration corresponding to another mechanical electronic unit 32 to 1.5 pF, the antenna works in the best state.

Referring to FIG. 1 to FIG. 4, in an embodiment, the antenna body 30 further includes an annular metal frame 33 coupled to the antenna base through two mechanical electronic units 31, 32.

In this embodiment, the annular metal frame 33 can be made of pure metal material, or can be composed of metal materials and non-metal materials. The annular metal frame 33 forms a part of housing of the smart wearable device and does not need to occupy the space on the top of the housing, which can well meet the housing design requirements of ultra-thin smart wearable devices. The annular metal frame 33 can be made of titanium alloy, aluminum or other metal materials. The outer contour of the annular metal frame 33 may be circular, square or polygonal. Certainly, in other embodiments, the shape of the annular metal frame 33 is not limited, as long as it can adapt to the shape of the smart wearable device.

The present application also proposes a smart wearable device, which includes the above antenna apparatus for the smart wearable device.

The detailed structure of the antenna apparatus for the smart wearable device can be referred to the above embodiments and will not be described again here. It can be understood that since the above antenna apparatus for the smart wearable device is applied in the smart wearable device of the present application, therefore the embodiments of the smart wearable device of the present application include all the technical solutions of all the embodiments of the antenna apparatus for the smart wearable device mentioned above, and the technical effects achieved are exactly the same, which will not be described again here.

Referring to FIG. 1 to FIG. 4, the smart wearable device also includes a surface cover and a bottom shell, and the surface cover and the bottom shell are respectively arranged on both sides of the annular metal frame 10 of the antenna apparatus for the smart wearable device to enclose a receiving cavity; and an electronic control component located in the receiving cavity and electrically connected to the antenna apparatus for the smart wearable device.

In this implementation, the material of the surface cover and the bottom shell can be made of hard materials such as plastic, tempered glass or the like, which is not limited here. The bottom shell can be enclosed with the surface cover and the frame to form a housing of the smart wearable device, a receiving cavity is formed in the housing, the display assembly, the antenna adjustment controller 40 and battery of the smart wearable device can be accommodated in the receiving cavity, and forms the dial of the smart wearable device with the housing. The electronic control component includes an electronic control board 50 and various functional circuit parts provided on the electronic control board 50, the controllable capacitor C1 in the above embodiment can be provided on the electronic control board 50. The surface cover can be a touch screen, and when the display module is a display screen, the surface cover and the display module can be integrated through a screen bonding assembly process. The annular metal frame 10 can be a hollow structure, the surface cover covers one side of the annular metal frame 10, and the bottom shell covers the other end of the annular metal frame 10, so that the surface cover, the annular metal frame 10 and the bottom shell are stacked in sequence and enclosed to form a receiving cavity. The surface cover and the annular metal frame 10 can be bonded with waterproof glue, the bottom shell and the annular metal frame 10 can be bonded with waterproof glue to achieve waterproofing between the surface cover and the annular metal frame 10 and waterproofing between the bottom shell and the annular metal frame 10, thereby preventing the external moisture from entering the receiving cavity and ensuring that the electronic control assembly in the receiving cavity can operate normally and stably. The electronic control assembly can realize functions such as making calls, sending and receiving information, taking pictures, video calls, scanning QR codes, mobile payments, viewing environmental information, viewing body information and so on. Therefore, in this embodiment, the electronic control assembly also includes a camera 60, a battery, a speaker, a microphone, a card holder assembly, a wireless communication module and sensors that implement various functions, which are not shown in the figure. The sensors can be gravity sensors, acceleration sensors, distance sensors, heart rate sensors, air pressure sensors, ultraviolet detectors and so on. The wireless communication module in the electronic control assembly can be WIFI, 5G communication module, GPS, Bluetooth communication module and so on, the wireless communication module is electrically connected to the antenna structure, thereby receiving and transmitting data through the antenna structure. The electronic control assembly may include components for identity recognition, such as fingerprint recognition sensors, facial recognition sensors and so on. Depending on different wireless communication module, the setting type of the antenna structure and the setting number of the antenna structure are also different, for example, when a WIFI module is provided in the smart wearable device, the antenna structure includes a WIFI antenna capable of WIFI communication, and when a Bluetooth communication module is provided, the antenna structure includes a Bluetooth antenna capable of realizing Bluetooth communication.

The above are only some embodiments of the present application, and are not intended to limit the scope of the present application. Under the application concept of the present application, any equivalent structure transformation made by using the description and accompanying drawings of the present application, or directly or indirectly applied in other related technical fields, is included within the scope of the present application.

What is claimed is:

1. An antenna apparatus for a smart wearable device, comprising:
    an antenna base;
    a watchband electrically connected to the antenna base, wherein when the smart wearable device is worn by a user, a length formed from a tangent point between the watchband and a user's arm to a connection point between the watchband and the antenna base is a first length;
    an antenna body coupled to the antenna base; and
    a wearing posture detection circuit electrically connected to the antenna body and configured to determine a worn posture of the smart wearable device according to the first length.

2. The antenna apparatus for the smart wearable device according to claim 1, wherein the antenna body and the antenna base constitute a detection capacitance, and the wearing posture detection circuit is configured to determine the worn posture of the smart wearable device according to a size of the detection capacitance.

3. The antenna apparatus for the smart wearable device according to claim 2, wherein:
    the watchband forms two tangent points with the user's arm, lengths respectively formed by the two tangent points and two connection points of the antenna base are a first sub-length and a second sub-length;
    the antenna body and the antenna base constitute a first detection capacitance and a second detection capacitance; and
    the wearing posture detection circuit is configured to determine the worn posture of the smart wearable device according to a size of the first detection capacitance and a size of the second detection capacitance.

4. The antenna apparatus for the smart wearable device according to claim 1, further comprising:
    a mechanical electronic unit corresponding to a position of the watchband, wherein the mechanical electronic unit is respectively connected to the antenna body and the antenna base, and the mechanical electronic unit is electrically connected to the antenna base.

5. The antenna apparatus for the smart wearable device according to claim 4, wherein two mechanical electronic units are provided, and
    the two mechanical electronic units are respectively located on both sides of a center line of the antenna base along a direction of the watchband; or
    the two mechanical electronic units are respectively located on a same side of a center line of the antenna base along a direction of the watchband.

6. The antenna apparatus for the smart wearable device according to claim 1, further comprising:
    an adjustable capacitor, wherein one end of the adjustable capacitor is connected to the antenna base; and
    an antenna adjustment controller, wherein the antenna adjustment controller is electrically connected to the wearing posture detection circuit and the adjustable capacitor respectively, and is configured to adjust a capacitance value of the adjustable capacitor according to the worn posture to configure antenna parameters of the antenna apparatus for the smart wearable device.

7. The antenna apparatus for the smart wearable device according to claim 6, wherein the antenna adjustment controller comprises:
    a processor electrically connected to the wearing posture detection circuit, wherein the processor is configured to output a corresponding control signal according to the worn posture; and
    an adjustable capacitor drive chip, wherein a controlled end of the adjustable capacitor drive chip is connected to the processor, an output end of the adjustable capacitor drive chip is electrically connected to the adjustable capacitor, and the adjustable capacitor drive chip is configured to adjust the capacitance value of the adjustable capacitor according to the control signal to configure the antenna parameters of the antenna apparatus for the smart wearable device.

8. The antenna apparatus for the smart wearable device according to claim 1, wherein the antenna body further comprises an annular metal frame coupled to the antenna base.

9. The antenna apparatus for the smart wearable device according to claim 1, further comprising:
    a motion sensor connected to the wearing posture detection circuit,
    wherein the motion sensor is configured to obtain motion data of the smart wearable device, and the wearing posture detection circuit is further configured to determine the worn posture of the smart wearable device based on the motion data of the smart wearable device.

10. A smart wearable device, comprising the antenna apparatus for the smart wearable device according to claim 1.

* * * * *